United States Patent
Kostin et al.

(10) Patent No.: US 10,220,894 B2
(45) Date of Patent: Mar. 5, 2019

(54) VEHICLE WITH IMPROVED BACKSEAT ARRANGEMENT AND SPARE WHEEL WELL

(71) Applicant: Brose Fahrzeugteile GmbH & Co. KG, Coburg, Coburg (DE)

(72) Inventors: Sergej Kostin, Coburg (DE); Michael Boehm, Coburg (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 38 days.

(21) Appl. No.: 15/424,034

(22) Filed: Feb. 3, 2017

(65) Prior Publication Data

US 2017/0247066 A1 Aug. 31, 2017

(30) Foreign Application Priority Data

Feb. 26, 2016 (DE) .................. 10 2016 203 132

(51) Int. Cl.
| | |
|---|---|
| B62D 43/00 | (2006.01) |
| B62D 43/10 | (2006.01) |
| B62D 25/20 | (2006.01) |
| B60N 2/005 | (2006.01) |

(52) U.S. Cl.
CPC .......... B62D 43/10 (2013.01); B62D 25/2027 (2013.01); B60N 2/005 (2013.01)

(58) Field of Classification Search
CPC ..... B62D 43/10; B62D 25/2027; B60N 2/005
See application file for complete search history.

(56) References Cited

U.S. PATENT DOCUMENTS

| 9,096,178 B1* | 8/2015 | Stanczak ................ B60R 5/045 |
| 2003/0102686 A1 | 6/2003 | McLeod et al. |
| 2005/0057061 A1 | 3/2005 | McClure et al. |
| 2006/0017301 A1 | 1/2006 | Edwards |

(Continued)

FOREIGN PATENT DOCUMENTS

| CN | 1597412 A | 3/2005 |
| CN | 1599678 A | 3/2005 |

(Continued)

OTHER PUBLICATIONS

CN First Office action dated Oct. 23, 2018 issued in corresponding CN Application No. 2017/10107508.5, 5 pages, with English translation, 1 page.

*Primary Examiner* — Lori L Lyjak (74) *Attorney, Agent, or Firm* — Lewis Roca Rothgerber Christie LLP (57) ABSTRACT

A vehicle including a rear seat arrangement for a rear seat row and having a spare wheel recess arranged in the rear region of the vehicle—relative to a vehicle longitudinal axis—a spare wheel for the vehicle being received the spare wheel recess. A rigid carrier portion, which is fixed to the body of a supporting structure of the rear seat arrangement, is located with a lower face facing the cover of the spare wheel recess above a reference plane or extends along a reference plane, wherein the reference plane runs at an angle a to the wheel plane on the front face of the spare wheel and the wheel plane intersects a cutting line which is located in a vertical plane running perpendicular to the vehicle longitudinal axis and tangential to the running surface of the spare wheel.

10 Claims, 5 Drawing Sheets

(56) References Cited

U.S. PATENT DOCUMENTS

| | | |
|---|---|---|
| 2007/0096488 A1 | 5/2007 | Suzuki et al. |
| 2010/0060040 A1 | 3/2010 | Yasuhara et al. |
| 2013/0119695 A1 | 5/2013 | Rosenplaenter et al. |
| 2016/0046335 A1* | 2/2016 | Saido .................... B62D 43/10 296/37.2 |

FOREIGN PATENT DOCUMENTS

| | | |
|---|---|---|
| CN | 1724303 A | 1/2006 |
| CN | 1955056 A | 5/2007 |
| CN | 103101454 A | 5/2013 |
| DE | 197 02 258 A1 | 7/1998 |
| DE | 10 2010 051 820 A1 | 5/2012 |
| EP | 0 939 024 A1 | 9/1999 |
| JP | 2008-247312 | 10/2008 |

* cited by examiner

VEHICLE WITH IMPROVED BACKSEAT ARRANGEMENT AND SPARE WHEEL WELL

REFERENCE TO RELATED APPLICATION

This application claims priority to German Patent Application No. 10 2016 203 132.5 filed on Feb. 26, 2016, the entirety of which is incorporated by reference herein.

BACKGROUND

The invention relates to a vehicle comprising a rear seat arrangement and spare wheel recess.

A generic vehicle in this case comprises a rear seat arrangement for a rear seat row and a spare wheel recess arranged in a rear region of the vehicle—relative to a vehicle longitudinal axis and a vehicle longitudinal direction extending parallel thereto. A spare wheel for the vehicle is received in this spare wheel recess. Generally, a rear seat arrangement is entirely arranged in front of a spare wheel recess or the rear seat arrangement is able to be at least partially folded away in order to be able to remove the spare wheel from the spare wheel recess if required. In the last-mentioned case a rigid carrier of a seat lower frame of the respective rear seat arrangement is adjustably mounted. In this case, a structure supporting a seat cushion and/or a backrest of the rear seat arrangement is able to be adjusted from a region above the spare wheel recess so that the spare wheel is able to be removed from the spare wheel recess if required. Such solutions are disclosed, for example, in DE 197 02 258 A1, DE 10 2010 051 820 A1 and EP 0 939 024 A1.

Rear seat arrangements with adjustable supporting structures, however, require complex measures for securing the rear seat arrangement in the event of a crash. Thus it has to be ensured that in the event of a crash the supporting structure, which is adjustable for removing the spare wheel, remains in an intended position when the supporting structure is in a position of use and a vehicle occupant is seated on the rear seat arrangement. In principle, therefore, it would be preferable to design a region above the spare wheel recess without parts of the rear seat arrangement. However, in newer vehicle types it is difficult to be able to combine this with the demand to provide a further third seat row. Conventionally, a spare wheel recess has hitherto been dispensed with here. Instead tyre repair sets are provided. This is unsatisfactory, however, particularly in off-road vehicles. Therefore, in off-road vehicles it is alternatively provided to arrange a spare wheel on the rear of the vehicle or in the region of the sub-floor of the vehicle. This in turn, however, has a negative effect on the vehicle length or the floor clearance and the fuel consumption.

SUMMARY

Therefore, it is an object of the invention to propose an improved vehicle in this regard, in particular a motor vehicle, in which the aforementioned drawbacks may be avoided.

This object is achieved by a vehicle with features as described herein.

Accordingly, taking into account fewer parameters, a specific arrangement and construction of a rear seat arrangement is proposed regarding a spare wheel recess and the spare wheel to be accommodated therein, which, on the one hand, permits a constructional space to be able to be used above a spare wheel recess for the arrangement of a rear seat arrangement inside the vehicle, without parts of the seat subframe necessarily having to be designed to be adjustable and, on the other hand, at the same time ensures that the spare wheel may be removed without great difficulty from the spare wheel recess.

According to the invention, in this case it is provided that the spare wheel which is accommodated in the spare wheel recess has a diameter $d_E$ and a height $h_E$ and the spare wheel recess has a diameter $d_M > d_E$ and a height $h_M > h_E$ so that the spare wheel is fully received in the spare wheel recess and a wheel plane tangential to the front face of the spare wheel and oriented perpendicular to the running surface of the spare wheel runs below an edge of the spare wheel recess. The spare wheel is thus recessed relative to an edge of the spare wheel recess so that, for example, a cover may be inserted into the opening of the spare wheel recess, said cover terminating flush with a vehicle floor. The cover, however, may also protrude from the vehicle floor. The cover, in principle, has a thickness e and covers the spare wheel received in the spare wheel recess.

The rear seat arrangement has a carrier which is fixed to the body and which is preferably immovable, preferably as part of a seat subframe which extends at least with a rigid carrier portion above the spare wheel recess and the cover beyond a front part of the spare wheel received in the spare wheel recess—relative to the vehicle longitudinal axis. The carrier thus uses a constructional space which is available above the spare wheel recess which is closed by means of the cover. In order to permit, therefore, a removal of the cover and a removal of the spare wheel from the spare wheel recess, without the carrier and its carrier portion itself being adjustable and, for example, having to be folded forward and/or displaced in the direction of the vehicle front, according to the invention it is proposed to predetermine the carrier portion extending beyond the front part of the spare wheel received in the spare wheel recess in its position and structures relative to an easily determinable reference plane. Thus it is provided that the carrier portion which is fixed to the body is located above a reference plane or extends in a reference plane, with a lower face facing the cover, when a vehicle occupant is able to sit as intended on a seat or a plurality of seats of the rear seat arrangement, wherein
the reference plane runs at an angle α to the wheel plane and the wheel plane intersects a cutting line which is located in a vertical plane running perpendicular to the vehicle longitudinal axis and tangential to the running surface of the spare wheel received in the spare wheel recess,
the angle α corresponds to the following formula $$\alpha = \arcsin \frac{h_E + e + k}{\frac{1}{2} d_M \left(1 + \frac{d_E}{d_M}\right)}.$$

and
k is in the interval [1.5 cm; 5 cm].

The parameter k is a handling parameter. Said handling parameter k in this case is part of a handling clearance defined thereby which results from the sum of the thickness e of a preferably plate-shaped cover for the spare wheel recess and an average thickness of the fingers of one hand.

It has surprisingly been shown that by considering the aforementioned conditions in a relatively simple manner in the construction and design of a rear seat arrangement and a spare wheel recess it is ensured in a simple manner that (a)

not only the cover is easily removed or adjusted from the spare wheel recess in order to make the spare wheel accessible, in particular is able to be displaced or folded, but that also (b) the spare wheel may be easily removed from the spare wheel recess without colliding with the carrier of the rear seat arrangement and without the risk of injury to the fingers and hands of a user.

In one exemplary embodiment, the handling parameter k is specified in the interval [2 cm; 3 cm]. With this relatively narrow specification it is also ensured, with the additional measure that the carrier portion of the rear seat arrangement is located above the reference plane or adjoins this reference plane to a maximum extent, that the requirements for optimal use of constructional space and the ability to remove the spare wheel are fulfilled as far as possible.

The carrier portion extending beyond the front part of the spare wheel received in the spare wheel recess is preferably immovable, i.e. not designed to be adjustable and fixed to the body. The carrier portion thus always remains in a (crash-proof) position in which it extends at least partially above the spare wheel recess and is also not adjustable from this position in order to make removal of the spare wheel possible. In fact, it is already ensured via the arrangement according to the invention that the spare wheel may be removed without adjusting the carrier. However, this does not exclude an adjustable element of the rear seat arrangement being provided on the carrier portion, said adjustable element being able to be adjusted if required, i.e. for removing the spare wheel, or a seat of the rear seat arrangement being able to be adjusted for setting a desired seating position. The carrier which is fixed to the body, however, is not connected to a vehicle floor via a releasable lock which is thus only able to be designed to be crash-safe in a complex manner in order to be able to fold the seat subframe, for example, to the front. Preferably, the carrier is fixed permanently via screw connections, welded connections, bolt connections and/or rivet connections to the vehicle body.

For example, on the carrier portion an element of the rear seat arrangement is adjustably mounted between a position of use and a removal position provided for removing the spare wheel from the spare wheel recess. In this case, the adjustable element may also be arranged in its position of use extending below the reference plane and above the spare wheel recess. In the removal position, however, the additional element is arranged above the reference plane in order to exclude a collision with the spare wheel to be removed. A position of use of the additional element of the rear seat arrangement in this case generally coincides with a position of use of the rear seat arrangement in which a vehicle occupant is able to be seated as intended on a seat or a plurality of seats of the rear seat arrangement. This may be precluded in the removal position of the additional element, but is not necessarily the case.

In one variant, the spare wheel recess is provided in a vehicle floor of the vehicle and the carrier portion located with its lower face above the reference plane or extending along the reference plane is part of a supporting structure of the rear seat arrangement which is connected to the vehicle floor on both sides of the spare wheel recess transversely to the vehicle longitudinal axis. As a result, in this case the supporting structure is connected to the vehicle floor on the right and left of the spare wheel recess, relative to the vehicle longitudinal axis, so that the carrier spans the spare wheel recess in the manner of a bridge and namely particularly in a region in which the front part of the spare wheel is located when the spare wheel is received as intended in the spare wheel recess. In this case, it may be provided that no portion of the supporting structure, which extends between two fastenings of the supporting structure spaced apart from one another transversely to the vehicle longitudinal axis on the vehicle floor above the spare wheel recess, is located below the reference plane.

The carrier portion generally extends to a maximum extent above the centre of the spare wheel received in the spare wheel recess so that the carrier portion extends beyond a front part of the spare wheel received in the spare wheel recess according to the invention. The carrier portion thus does not extend with an offset of any size in a constructional space above the spare wheel received in the spare wheel recess in the direction of the rear of the vehicle, whereby the removal of the spare wheel might be potentially made difficult. Instead, in one variant, the carrier portion protrudes to a maximum extent as far as the centre of the spare wheel. The carrier portion is also preferably not offset transversely to the vehicle longitudinal axis, at any distance to the left or right, so that colliding with the spare wheel to be removed is already excluded thereby. The focus of the invention instead is, in particular, to use in a manner which is as optimal as possible a constructional space above the spare wheel received in the spare wheel recess, and to provide improved strength and improved crash safety through the carrier portion fixed to the body and the supporting structure formed thereby.

The carrier portion extends in one variant substantially transversely to the vehicle longitudinal axis, for example, as a cross member of a seat subframe of the rear seat arrangement.

Alternatively or additionally, the carrier may be fixed to a vehicle floor of the vehicle in front of the spare wheel recess relative to the vehicle longitudinal axis. In this case, the carrier forming the carrier portion, for example, is fixed to the vehicle floor on both sides of the spare wheel recess, i.e. to the right and left relative to the vehicle longitudinal axis and additionally to the front of the spare wheel recess so that the at least three fastening points of the carrier of the rear seat arrangement on the vehicle floor form the corner points of a virtual triangle. The carrier portion extending beyond the front part of the spare wheel received in the spare wheel recess in this case extends, for example, substantially along a base of such a virtual triangle.

Furthermore, the carrier may also have a portion extending along the vehicle longitudinal axis which is connected to the carrier portion and which is fixed to the vehicle floor in front of the spare wheel recess.

BRIEF DESCRIPTION OF THE DRAWINGS

The accompanying figures illustrate one possible exemplary embodiment of the solution according to the invention.

DETAILED DESCRIPTION

FIGS. 1A to 1C, 2 and 3A to 3B illustrate in different views a rear seat arrangement R and a spare wheel recess 5 in a variant of a vehicle according to the invention. In this case the rear seat arrangement R and the spare wheel recess 5 provided in a vehicle floor B of the vehicle are arranged and designed such that without the adjustability of a supporting structure T of the rear seat arrangement R a spare wheel E accommodated in the spare wheel recess 5 may be easily removed, without colliding with the supporting structure T of the rear seat arrangement R, and at the same time the supporting structure T extends with a carrier 3 above the spare wheel recess 5 and the spare wheel E received therein.

The rear seat arrangement R in this case defines, for example, a 2nd or 3rd seat row in a motor vehicle. In the present case, the rear seat arrangement R comprises with two seats which in each case comprise a seat surface 1a or 1b and a backrest 2a or 2b belonging thereto. The supporting structure T supporting these seats as part of a seat subframe and connected to the vehicle floor B in this case also extends at least partially above the spare wheel recess 5 in order to use the available constructional space in a manner which is as optimal as possible. In this case, the carrier 3 extending transversely to a vehicle longitudinal axis A spans the spare wheel recess 5 in the manner of a bridge and namely in a front part of the spare wheel recess 5 relative to a (forward) direction of travel F of the vehicle.

Figure 1A:
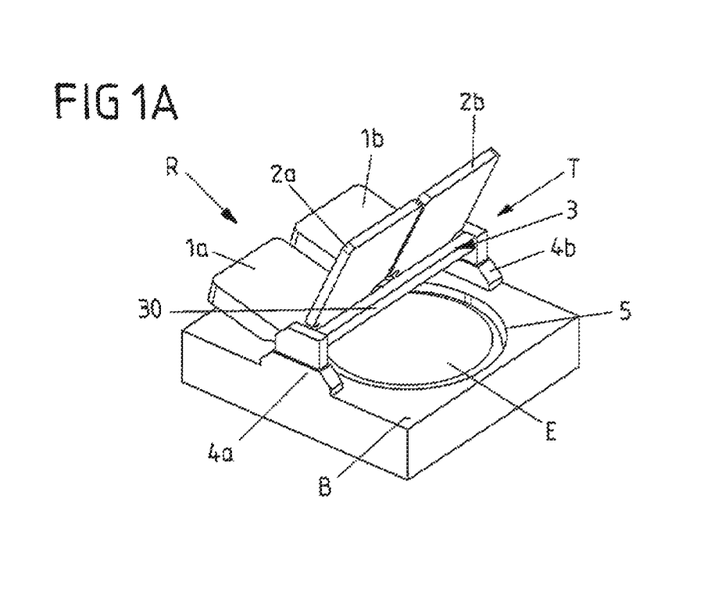
FIGS. 1A-1C show in different views a rear seat arrangement of a vehicle according to the invention with a spare wheel recess incorporated into a vehicle floor, a carrier portion of a supporting structure of the rear seat arrangement extending above said spare wheel recess.
Figure 1B:
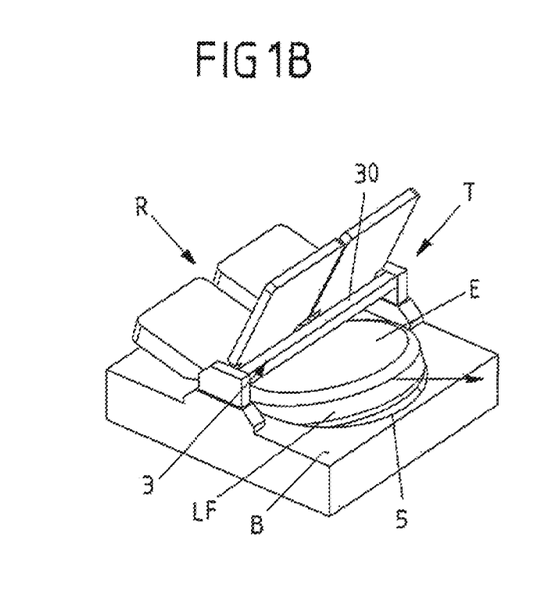
Figure 1C:
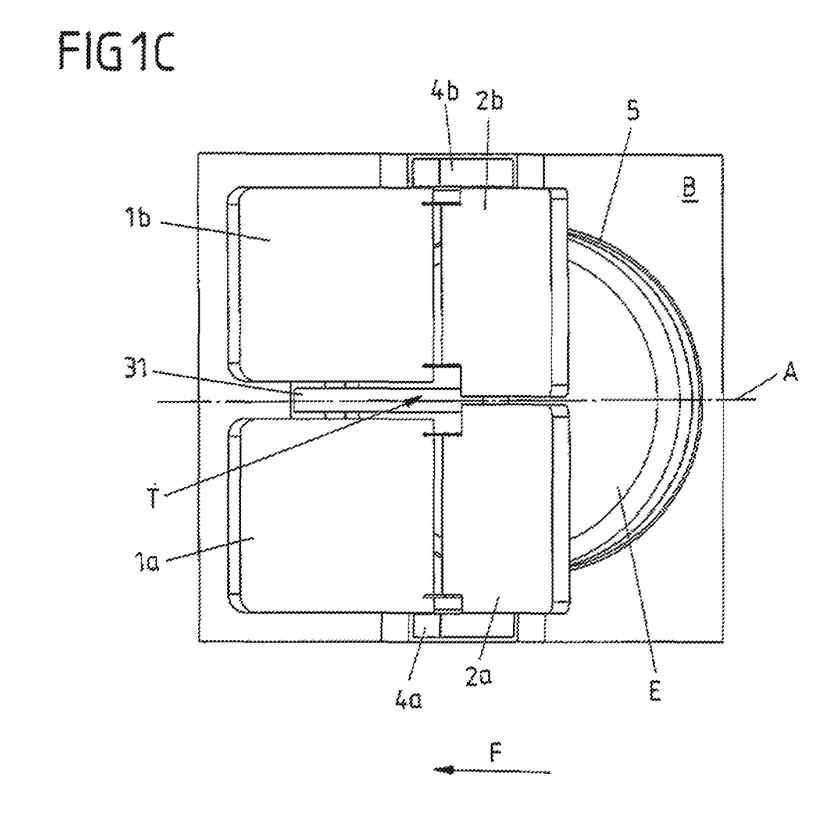

The carrier 3 has in this case a carrier portion 30 which extends above the spare wheel recess 5 and which is fixed to the right and left of the spare wheel recess 5 via fastenings 4a and 4b to the vehicle floor B and thus is fixed to the body. A longitudinal portion 31 of the carrier 3 runs transversely to the direction of extent of the carrier portion 30. This longitudinal portion 31 is fixed to the vehicle floor B in front of the spare wheel recess 5. In this manner, the supporting structure T is fixed to the vehicle floor B in front of, and on both sides of, the spare wheel recess 5 and is thus fixed to the body.

Figure 3A:
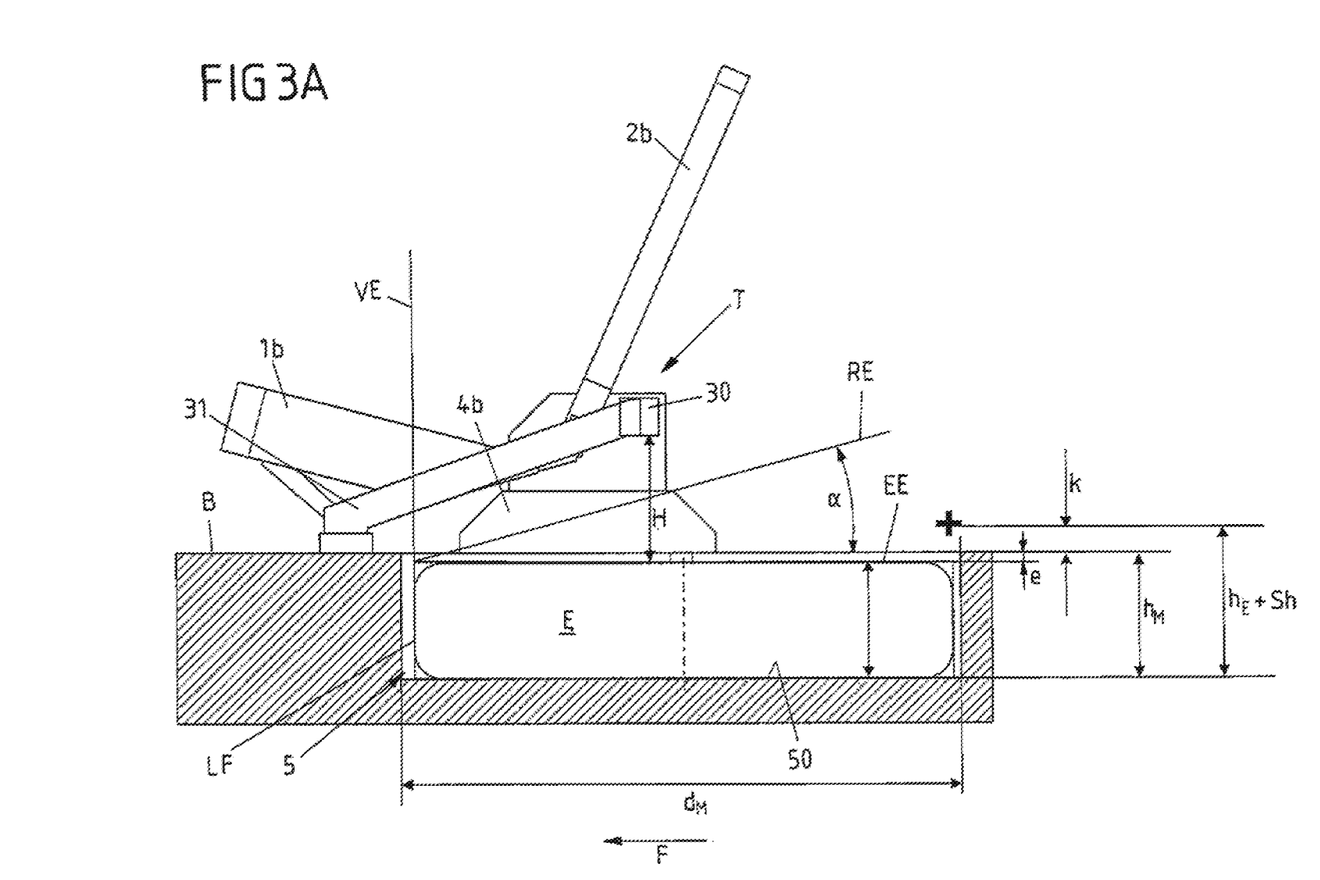
FIG. 3A shows the rear seat arrangement in a sectional side view with an illustration of a reference plane, a carrier of the rear seat arrangement extending above said reference plane when the carrier extends above the spare wheel recess.
Figure 3B:
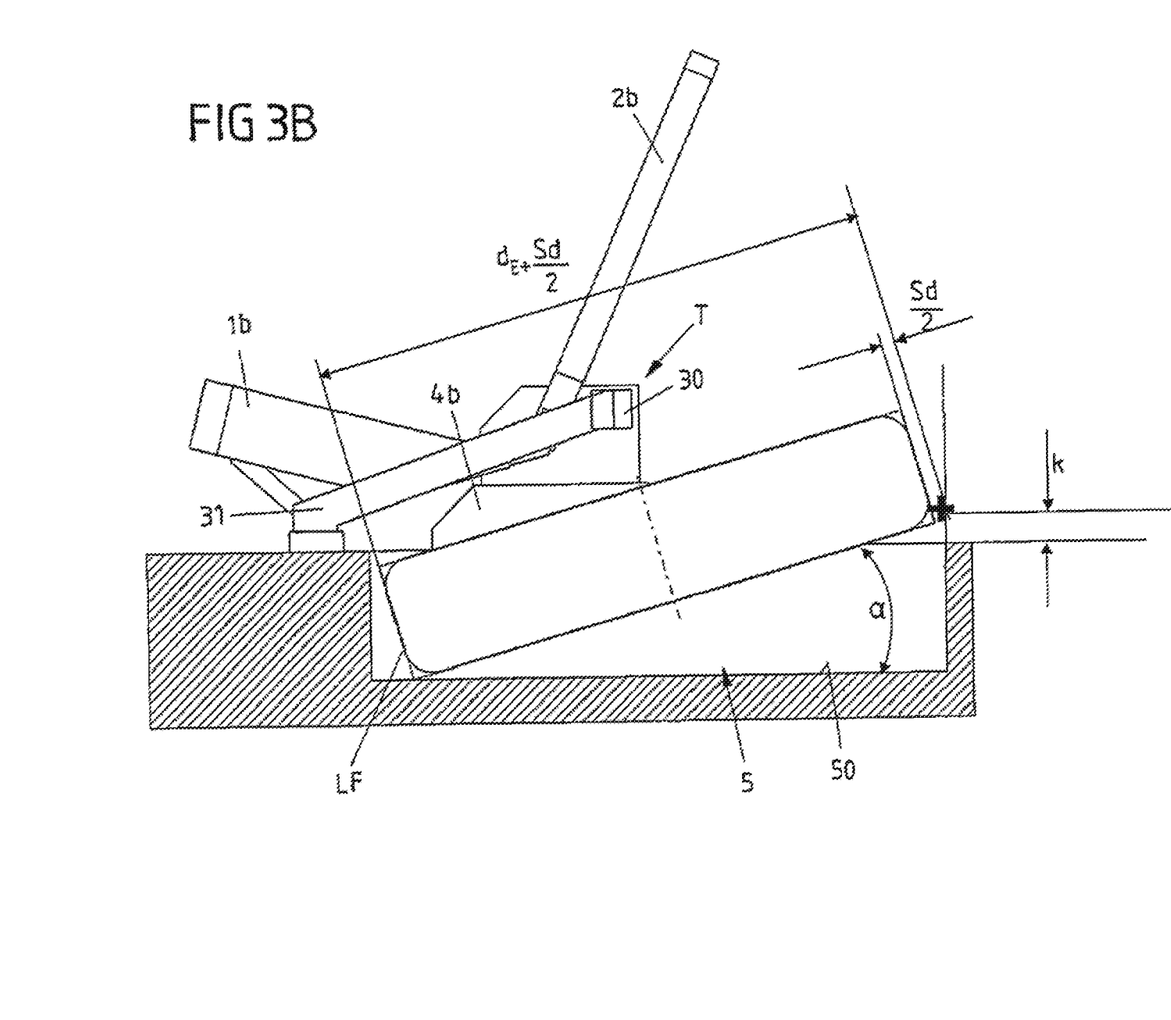
FIG. 3B shows in a sectional side view coinciding with FIG. 3A an illustration of the removal of the spare wheel from the spare wheel recess.

So that the spare wheel E, as shown in FIGS. 1B and 3B, may be removed from the spare wheel recess 5 which is circular in plan view, without the supporting structure T of the rear seat arrangement R having to be adjusted and without the spare wheel E colliding with the rear seat arrangement R, the supporting structure T of the rear seat arrangement R and, in particular, the carrier 3 with its carrier portion 30 is arranged in a precisely defined position above a reference plane RE. This reference plane RE is illustrated in more detail in FIG. 3A.

Figure 2:
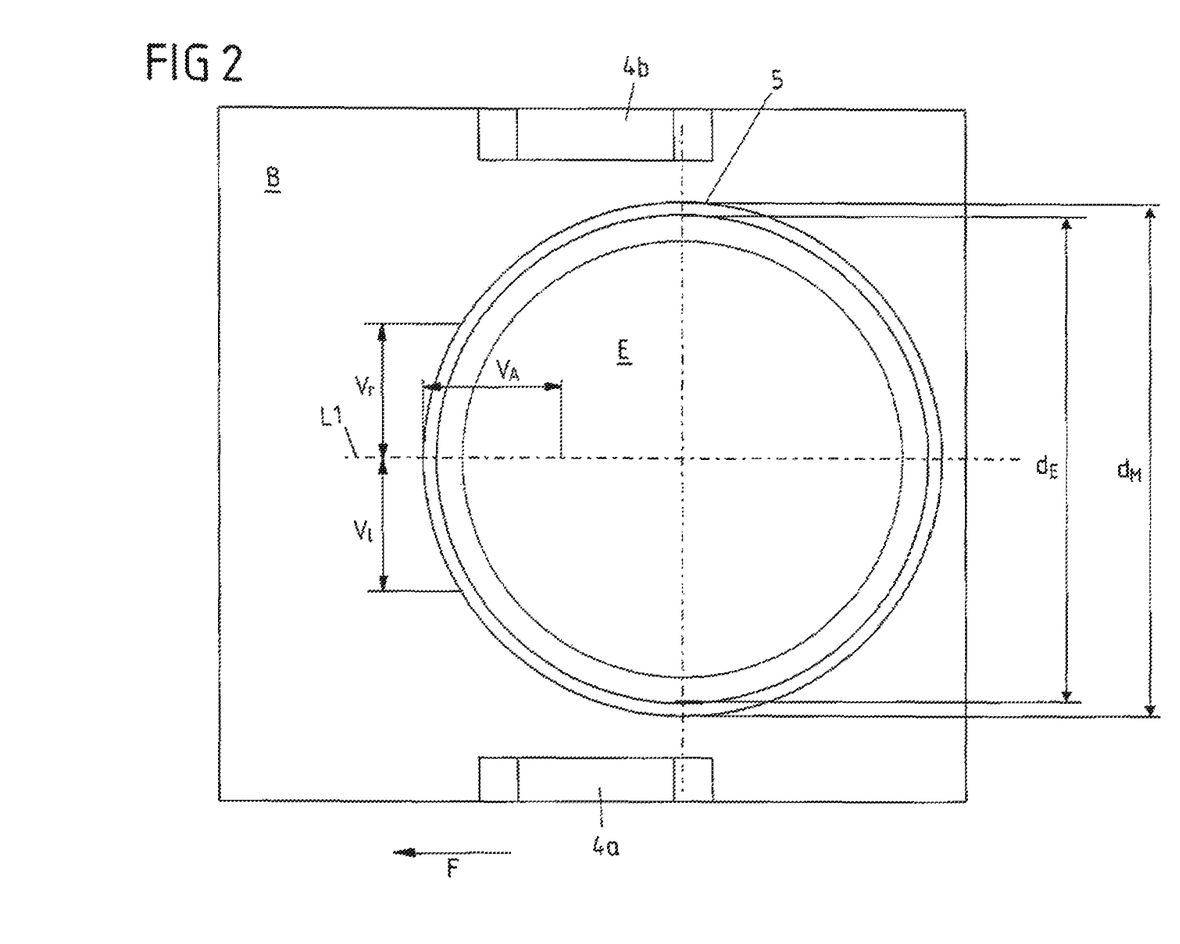
FIG. 2 shows a plan view of the vehicle floor with the spare wheel recess and the spare wheel received therein.

In FIG. 3A, in particular when viewed together with FIG. 2 and FIG. 3B, the position of the reference plane RE is illustrated, above which the supporting structure T is located or is able to extend to a maximum extent along the reference plane RE, in order to ensure a collision-free removal of the spare wheel E from the spare wheel recess 5. The reference plane RE in this case extends at an angle α inclined to a wheel plane EE obliquely to the rear and to the top relative to the direction of travel F (and thus in the present case also by the angle α inclined relative to the vehicle longitudinal axis A). The wheel plane EE is tangential to the upper front face of the spare wheel E—remote from a floor 50 of the spare wheel recess 5—and is oriented perpendicular to the running surface LF of the spare wheel E. In the present case, the wheel plane EE runs parallel to the vehicle longitudinal axis A. The reference plane RE in turn has a line intersecting with the wheel plane EE of the spare wheel E which is located in a vertical plane VE extending perpendicular to the vehicle longitudinal axis A (and the direction of travel F).

The position of the vertical plane VE relative to the vehicle longitudinal axis A in this case is predetermined by the running surface LF of the spare wheel E. Thus the vertical plane VE is tangential to the running surface LF of the spare wheel E accommodated in the spare wheel recess 5 in the region of the rear seat arrangement R. The vertical plane VE is thus tangential to the running surface LF and the circumference of the spare wheel E on a front region located in the direction of travel F. The vertical plane VE thus forms a reference for the position of the spare wheel E accommodated in the spare wheel recess 5 furthest to the front in the direction of travel F.

The wheel plane EE of the spare wheel E is located below an edge of the spare wheel recess 5, so that between the wheel plane EE and an edge of the spare wheel recess 5 in the sectional side view or cross-sectional view of FIGS. 3A and 3B a spacing is visible between the edge of the spare wheel recess 5 and the wheel plane EE. The spare wheel E is thus fully received in the spare wheel recess 5 and does not protrude therefrom.

The gap between the spare wheel E and the edge of the spare wheel recess 5 is closed by a (recess) cover not shown here. This covers the spare wheel E accommodated in the spare wheel recess 5 and preferably terminates flush with the vehicle floor B or extends over the entire rear region of the vehicle floor B. In the present case a height $h_M$ of the spare wheel recess 5 is thus not only greater than a height $h_E$ of the spare wheel E but corresponds at least to the sum of the height $h_E$ of the spare wheel B and a (wall) thickness e of the cover.

A diameter $d_M$ of the spare wheel recess 5 is also selected to be larger than a diameter $d_E$ of the spare wheel E, so that said spare wheel may be easily accommodated in the spare wheel recess 5 and may bear against the floor 50 of the spare wheel recess 5. The diameter $d_M$ of the spare wheel recess 5 in this case is not of arbitrary size. Instead, it is selected according to the diameter $d_E$ of the spare wheel E such that the diameter $d_M$ of the spare wheel recess 5 exceeds the diameter $d_E$ of the spare wheel E only by a defined clearance Sd. Therefore $Sd = d_M - d_E$ applies to this clearance Sd.

With regard to a required spacing or height H in which the supporting structure T is able to extend with the carrier 3 above the spare wheel recess 5, without the supporting structure T having to be designed to be adjustable therefor, it has been surprisingly shown that only one reference plane RE is able to be defined, depending on few parameters, above which a part of the supporting structure T, extending over the spare wheel recess 5, should extend. Thus, in addition to the parameters predetermined as a result of the structure, such as the diameters $d_M$ and $d_E$ of the spare wheel recess 5 and the spare wheel E, the thickness e of the cover and the height $h_E$ of the spare wheel E, only one handling parameter k has to be predetermined. This handling parameter k is part of a handling clearance Sh which results from the sum of the thickness e of a preferably plate-shaped cover for the spare wheel recess E and an average thickness of the fingers of a hand. When predetermining the handling parameter k in the interval [1.5 cm; 5 cm], for example in the interval [2 cm; 3 cm], the position of the reference plane RE relative to the wheel plane EE may be solely implemented by the angle α, in that for this angle α the following applies $$\alpha = \arcsin \frac{h_E + e + k}{\frac{1}{2} d_M \left(1 + \frac{d_E}{d_M}\right)}.$$

If in the construction and arrangement of the rear seat arrangement R it is considered that the part of a supporting structure T of the rear seat arrangement R extending above the spare wheel recess 5 is located above or to a maximum extent on the reference plane RE predetermined in this manner, which runs at the angle α to the wheel plane EE, an adjustability of the supporting structure T is not required, so that a user is able to remove the spare wheel E from the spare wheel recess 5 without collision.

The supporting structure T in this case may extend, in particular, in a constructional space illustrated in more detail with reference to FIG. 2, above the spare wheel recess 5, so that the supporting structure T with the carrier 3 also extends, in particular, above a front part of the spare wheel E relative to the direction of travel F. Thus the carrier 3 with its carrier portion 30 may also be offset, in particular, to the right and left by an offset Vr, Vl to a central line L1 extending through the centre of the spare wheel E and parallel to the vehicle longitudinal axis A, where Vr is in the interval [0; $d_E/3$] and Vl is in the interval [0; $d_E/3$]. Also the supporting structure T and thus the carrier 3 may protrude in the direction of the vehicle rear along the vehicle longitudinal axis A by an offset VA—measured from a front edge of the spare wheel recess 5—to the rear and extend above the spare wheel recess 5. Preferably, the offset VA is in the interval [$d_M/3$; $d_M/2$]. In this manner, as a result the supporting structure T may protrude to the rear up to a maximum relative to the centre of the spare wheel E accommodated in the spare wheel recess 5.

LIST OF REFERENCE NUMERALS

1a, 1b Seat surface
2a, 2b Backrest
3 Carrier
30 Carrier portion
31 Longitudinal portion
4a, 4b Fastening
5 Spare wheel recess
50 Floor
A Vehicle longitudinal axis
B Vehicle floor
$d_E$ Diameter (spare wheel)
$d_M$ Diameter (spare wheel recess)
E Spare wheel
e Thickness/wall thickness
EE Wheel plane
F Direction of travel
H Height/spacing
$h_E$ Height (spare wheel)
$h_M$ Height (spare wheel recess)
k Handling parameter
L1 Centre line
LF Running surface
R Rear seat arrangement
RE Reference plane
Sd Clearance
Sh Handling clearance
T Supporting structure
$V_A$, $V_l$, $V_r$ Offset
VE Vertical plane
α, α' Angle

The invention claimed is:

1. A vehicle, comprising a rear seat arrangement for a rear seat row and comprising a spare wheel recess arranged in the rear region of the vehicle—relative to a vehicle longitudinal axis—a spare wheel for the vehicle being received in said spare wheel recess, wherein the spare wheel has a diameter $d_E$ and a height $h_E$,
the spare wheel recess has a diameter $d_M > d_E$ and a height $h_M > h_E$, so that the spare wheel is fully received in the spare wheel recess and a wheel plane tangential to the front face of the spare wheel and oriented perpendicular to the running surface of the spare wheel runs below an edge of the spare wheel recess,
a cover with a thickness e is provided which covers the spare wheel received in the spare wheel recess,
the rear seat arrangement has a carrier which is fixed to the body and which extends at least with a carrier portion, which is fixed to the body, above the spare wheel recess and the cover beyond a front part of the spare wheel received in the spare wheel recess—relative to the vehicle longitudinal axis,
the carrier portion which is fixed to the body is located with a lower face facing the cover above a reference plane or extends along a reference plane, wherein
the reference plane runs at an angle α to the wheel plane and the wheel plane intersects a cutting line which is located in a vertical plane running perpendicular to the vehicle longitudinal axis and tangential to the running surface of the spare wheel received in the spare wheel recess,
the angle α corresponds to the following formula $$\alpha = \arcsin \frac{h_E + e + k}{\frac{1}{2} d_M \left(1 + \frac{d_E}{d_M}\right)},$$

and
k is in the interval 0.59 in-1.97 in.

2. The vehicle according to claim 1, wherein k is in the interval 0.78 in-1.81 in.

3. The vehicle according to claim 1, wherein the carrier portion extending beyond the front part of the spare wheel received in the spare wheel recess is immovable and fixed to the body.

4. The vehicle according to claim 1, wherein the spare wheel recess is provided in a vehicle floor of the vehicle and the carrier portion located with its lower face above the reference plane or extending along the reference plane is part of a supporting structure which is connected to the vehicle floor on both sides of the spare wheel recess transversely to the vehicle longitudinal axis.

5. The vehicle according to claim 4, wherein no portion of the supporting structure, which extends between two fastenings of the supporting structure spaced apart from one another transversely to the vehicle longitudinal axis on the vehicle floor above the spare wheel recess, is located below the reference plane.

6. The vehicle according to claim 1, wherein on the carrier portion element of the rear seat arrangement is adjustably mounted between a position of use and a removal position provided for removing the spare wheel from the spare wheel recess, wherein the adjustable element is arranged in its position of use below the reference plane and is arranged in its removal position above the reference plane.

7. The vehicle according to claim 1, wherein the carrier portion, viewed counter to a forward direction of travel of the vehicle, extends to a maximum extent above the centre of the spare wheel received in the spare wheel recess.

8. The vehicle according to claim 1, wherein the carrier portion extends substantially transversely to the vehicle longitudinal axis.

9. The vehicle according to claim 1, wherein the carrier is fixed to a vehicle floor of the vehicle in front of the spare wheel recess relative to the vehicle longitudinal axis.

10. The vehicle according to claim 9, wherein the carrier has a portion extending along the vehicle longitudinal axis which is connected to the carrier portion and which is fixed to the vehicle floor in front of the front contour of the spare wheel recess.

* * * * *